US012541386B2

(12) United States Patent
Shemer et al.

(10) Patent No.: US 12,541,386 B2
(45) Date of Patent: Feb. 3, 2026

(54) DISTRIBUTED DATA CENTER

(71) Applicant: EMC IP Holding Company LLC, Hopkinton, MA (US)

(72) Inventors: Jehuda Shemer, Kfar Saba (IL); Valerie Lotosh, Ramat-Gan (IL); Erez Sharvit, Ramat-Gan (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 1043 days.

(21) Appl. No.: 17/507,672

(22) Filed: Oct. 21, 2021

(65) Prior Publication Data

US 2023/0130897 A1 Apr. 27, 2023

(51) Int. Cl.
*G06F 9/455* (2018.01)

(52) U.S. Cl.
CPC .................... *G06F 9/45558* (2013.01); *G06F 2009/45579* (2013.01); *G06F 2009/45595* (2013.01)

(58) Field of Classification Search
CPC ....... G06F 9/45558; G06F 2009/45579; G06F 9/45595
See application file for complete search history.

(56) References Cited

U.S. PATENT DOCUMENTS 8,966,475 B2 2/2015 Srinivasan
10,671,431 B1 * 6/2020 Dolan .................. G06F 3/0649
11,875,191 B1 * 1/2024 Plenderleith ........ H04W 64/003
2003/0028729 A1 2/2003 Yamamoto et al.
2003/0126327 A1 7/2003 Pesola et al.
2005/0193245 A1 9/2005 Hayden et al.
2009/0172816 A1 7/2009 Maino et al.
2010/0049823 A1 2/2010 Saigo et al.
2012/0192006 A1 7/2012 Qi et al.
2014/0215272 A1 7/2014 Bauer et al.
2015/0074447 A1 3/2015 Park et al.
2015/0169417 A1 6/2015 Brandwine et al.
2015/0331753 A1 11/2015 Nakajima et al.
2015/0347221 A1 12/2015 Anderson et al.
2016/0062858 A1 3/2016 Gallagher et al.
(Continued)

OTHER PUBLICATIONS

Notice of Allowance mailed Feb. 8, 2024 for U.S. Appl. No. 17/507,661, 46 pages.
(Continued)

*Primary Examiner* — Tammy E Lee
(74) *Attorney, Agent, or Firm* — Amin, Turocy & Watson, LLP

(57) ABSTRACT

A system can maintain a first data center in a first physical location that comprises first compute hardware, and a second data center in a second physical location that comprises second compute hardware. The system can establish an overlay network that spans the first data center and the second data center. The system can establish a group of virtualized volume identifiers that spans the first data center and the second data center, and that virtualizes physical storage volumes. The system can determine whether to process a customer virtualized workload on the first data center or on the second data center to produce a selected location, wherein the customer virtualized workload is configured to be processed on the first data center and to be processed on the second data center. The system can process the customer virtualized workload at the selected location.

20 Claims, 10 Drawing Sheets

(56) References Cited

U.S. PATENT DOCUMENTS

| | | | | |
|---|---|---|---|---|
| 2016/0119202 | A1 | 4/2016 | Iyer et al. | |
| 2017/0242758 | A1 | 8/2017 | Chou et al. | |
| 2018/0365117 | A1 | 12/2018 | Basham et al. | |
| 2019/0163763 | A1 | 5/2019 | Pandey et al. | |
| 2019/0243725 | A1 | 8/2019 | Bade et al. | |
| 2019/0332275 | A1* | 10/2019 | Jin | G06F 11/2097 |
| 2020/0409803 | A1 | 12/2020 | Naidu et al. | |
| 2021/0034265 | A1* | 2/2021 | Abouelwafa | G06F 3/0647 |
| 2021/0281642 | A1* | 9/2021 | Padiyar | H04L 67/1095 |
| 2021/0342237 | A1 | 11/2021 | Polimera et al. | |
| 2022/0229685 | A1 | 7/2022 | Helvey et al. | |
| 2023/0125085 | A1 | 4/2023 | Shemer et al. | |
| 2023/0127061 | A1 | 4/2023 | Shemer et al. | |
| 2023/0128370 | A1 | 4/2023 | Shemer et al. | |

OTHER PUBLICATIONS

Office Action mailed Jun. 4, 2024 for U.S. Appl. No. 17/507,656, 25 pages.

Office Action mailed Aug. 3, 2023 for U.S. Appl. No. 17/507,661, 52 pages.

Notice of Allowance mailed Feb. 11, 2025 for U.S. Appl. No. 17/507,664, 28 pages.

Notice of Allowance mailed Sep. 12, 2024 for U.S. Appl. No. 17/507,656, 25 pages.

Office Action mailed Sep. 27, 2024 for U.S. Appl. No. 17/507,664, 47 pages.

* cited by examiner

900

MAINTAINING A FIRST DATA CENTER AS ACTIVE 904

MAINTAINING A SECOND DATA CENTER AS ACTIVE CONCURRENTLY WITH THE FIRST DATA CENTER BEING ACTIVE 906

DISTRIBUTED DATA CENTER

BACKGROUND

A data center can comprise a plurality of computers that are configured to store and/or operate on data. Managing a data center can comprise various operations.

SUMMARY

The following presents a simplified summary of the disclosed subject matter in order to provide a basic understanding of some of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

An example system can operate as follows. The system can maintain a first data center in a first physical location that comprises first compute hardware. The system can maintain a second data center in a second physical location that comprises second compute hardware. The system can establish an overlay network that spans the first data center and the second data center, and that virtualizes physical network resources of the first data center and the second data center. The system can establish a group of virtualized volume identifiers that spans the first data center and the second data center, and that virtualizes physical storage volumes. The system can determine whether to process a customer virtualized workload on the first data center or on the second data center to produce a selected location, wherein the customer virtualized workload is configured to be processed on the first data center and to be processed on the second data center. The system can process the customer virtualized workload at the selected location.

An example method can comprise maintaining, by a system comprising a processor, a first data center and a second data center. The method can further comprise facilitating, by the system, establishing an overlay network that spans the first data center and the second data center. The method can further comprise facilitating, by the system, establishing virtualized volume identifiers that span the first data center and the second data center. The method can further comprise determining, by the system, whether to execute a customer virtualized workload on the first data center or on the second data center to produce a selected location, wherein the customer virtualized workload is configured to be executed on the first data center and on the second data center. The method can further comprise executing, by the system, the customer virtualized workload at the selected location.

An example non-transitory computer-readable medium can comprise instructions that, in response to execution, cause a system comprising a processor to perform operations. The operations can comprise creating an overlay network that spans a first data center and a second data center. The operations can further comprise creating a group of virtualized volume identifiers that spans the first data center and the second data center. The operations can further comprise determining whether to run a customer virtualized workload on the first data center or on the second data center to produce a selected location, wherein the customer virtualized workload is configured to run on the first data center or the second data center. The operations can further comprise running the customer virtualized workload at the selected location.

BRIEF DESCRIPTION OF THE DRAWINGS

Numerous embodiments, objects, and advantages of the present embodiments will be apparent upon consideration of the following detailed description, taken in conjunction with the accompanying drawings, in which like reference characters refer to like parts throughout, and in which.

DETAILED DESCRIPTION

Example Architectures

Figure 1:
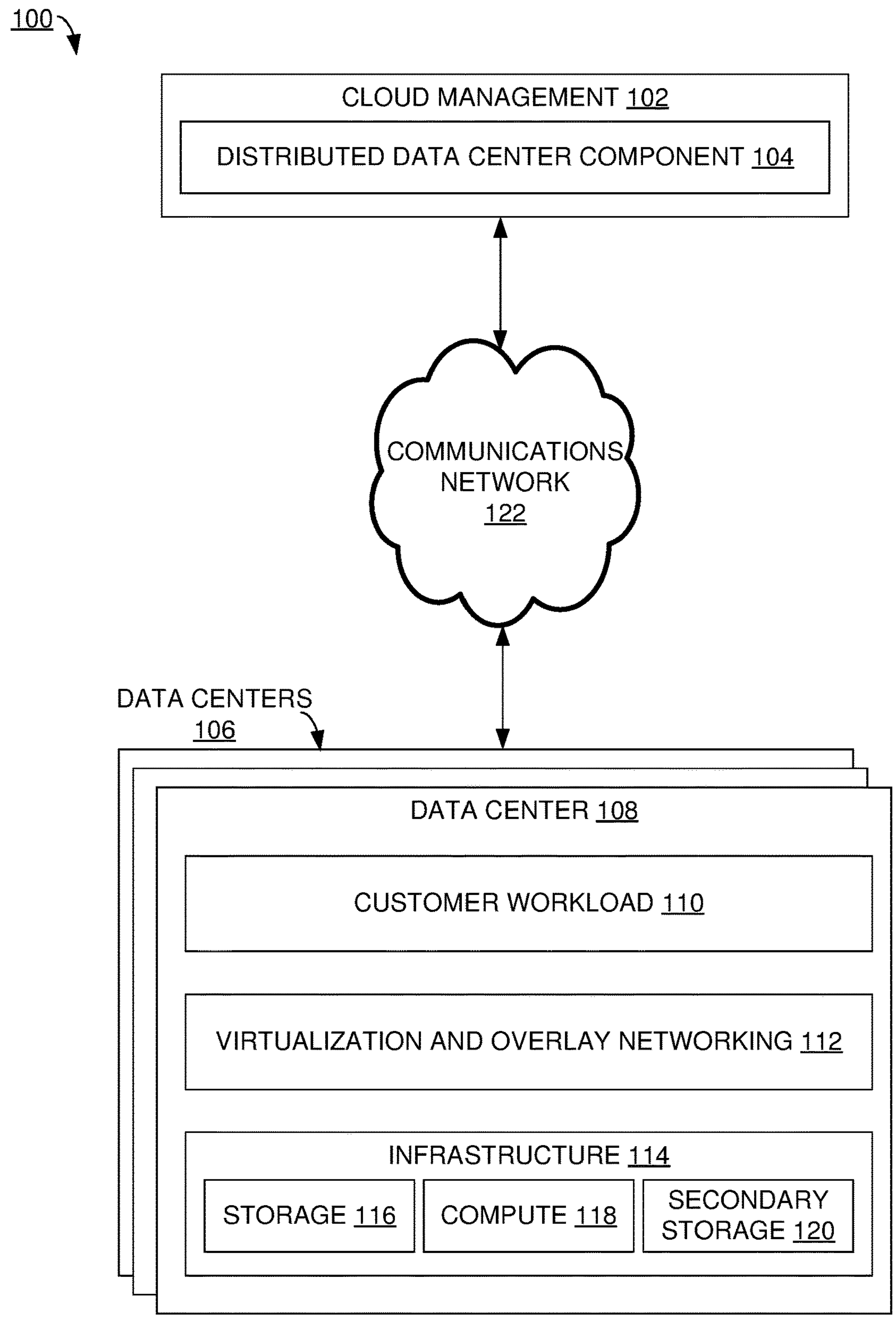
FIG. 1 illustrates an example system architecture that can facilitate a distributed data center, in accordance with an embodiment of this disclosure.

FIG. 1 illustrates an example system architecture 100 that can facilitate a distributed data center as a service, in accordance with an embodiment of this disclosure.

System architecture 100 can facilitate deployment and management of infrastructure at customer premise or hosted locations. System architecture 100 can facilitate consuming infrastructure as a service. System architecture 100 generally targets full data center deployments (e.g., data centers 106, in an architecture that can be referred to as data centers as a service (DCaaS)). System architecture 100 can comprise data centers that run virtual infrastructure (e.g., customer workload 110 operating on top of virtualization and overlay networking 112) and can facilitate data protection and mobility use of those data centers.

A data center (e.g., data center 108) in system architecture 100 can comprise compute (e.g., compute 118), storage (e.g., storage 116), and networking, and which has a virtualization layer (e.g., virtualization and overlay networking 112). That is, system architecture 100 can deploy a data center that can run infrastructure as a service (IaaS) workloads. Where system architecture 100 deploys infrastructure as a service, this can be referred to as IaaS as a service (IaaSaaS).

System architecture 100 can differ from other cloud offerings. Some other cloud offerings support creating extensions of themselves, which can be hosted in other locations. In the example of system architecture 100, cloud management 102 can be used to orchestrate and manage a completely independent customer data center (e.g., data center 108). The manner in which technologies are used, and the way that layers (e.g., infrastructure 114 and virtualization and overlay networking 112) can be decomposed in system architecture 100 can differ from that of other cloud offerings.

That is, in other cloud offerings, such as public clouds (where workloads for multiple customers are run on the same hardware and/or in the same data center), hardware resources can generally be shared between tenants (e.g., customers). This can lead to security concerns because one customer can be sharing hardware with a rival entity (e.g., two competing consumer packaged goods companies) or a malicious actor. A security hole or data leak can cause immediate damage. In contrast, with system architecture 100, a small deployment can be created that is dedicated to a customer and data can be stored on customer premises or stored in a dedicated area for the customer.

In other cloud offerings, management can be optimized for a small number of large hardware locations. Other cloud offerings can rely on uniformity and consistency of hardware and access in order to optimize their maintenance. In contrast, system architecture 100 can be used to manage a larger number of customer locations, each with a relatively small deployment. With system architecture 100, there can be differences in hardware between customer locations according to an age and/or version of deployment, or according to a price or service level agreement designation. The management issues associated with these two types of architectures can be different.

Cloud extensions can be additional hardware from a same cloud region located in a different physical place. In system architecture 100, each location can be a separate instance, which can be connected and/or extended by utilizing the present techniques.

System architecture 100 can be utilized to connect to existing customer data center components, whereas with other cloud offerings this can constitute a security violation.

System architecture 100 can be implemented to deploy or utilize hardware of a wide range of profiles and capabilities. This hardware can include one or more servers (e.g., compute 118) with a central processing unit, memory, local storage, and peripheral devices; one or more primary storage systems (e.g., storage 116, where primary storage can generally be optimized for performance (e.g., provide a low latency for reads and writes), and be used for running an organization's main applications and workloads); network switches and devices (e.g., network and/or a storage area network (SAN); and/or additional hardware for secondary storages (e.g., secondary storage 120, where, in contrast to primary storage, secondary storage can generally be optimized for long term reliability and capacity, and used for backup and data protection systems) or other services. This hardware can also include object storage, file systems, network attached storage (NAS), hardware for performance acceleration (e.g., graphics processing units (GPUs), cache cards, central processing unit (CPU) offload cards, smart network interface cards (NICs), etc.), and/or specialized servers or other hardware for specific purposes like stream servers, messaging, artificial intelligence (AI), image processing and/or security.

In some examples, this hardware can be configured and wired by an entity that manages cloud management 102, and on behalf of a customer that possesses data center 108. The hardware can be delivered to data center 108, or can be hosted by the entity that manages cloud management 102, or by a third party. In some examples, in hosting sites, general hardware can already be available at the time of a customer order, and be allocated to a customer upon a service request.

In addition to hardware, multiple software components can be deployed and managed in accordance with customer requests.

Cloud management 102 can comprise a cloud portal that provides a purchasing and management user interface, and that facilitates ordering hardware resources; managing resource usage; monitoring and error handling; and upgrade and life cycle.

Cloud management 102 can store customer-related information and details pertaining to customer infrastructure (e.g., an architecture of data center 108).

In system architecture 100, deployed infrastructure (e.g., deployed infrastructure of data center 108) can be managed by cloud management 102, and in some examples, a customer can be billed according to the resources that the customer utilizes (which can be referred to as, pay as you go). In such examples, the customer can avoid allocating an information technology (IT) team to manage the infrastructure.

In some examples, system architecture 100 involves deploying a full data center (e.g., data center 108), where the data center is entirely managed by cloud management 102, and where the data center is targeted for a virtualized workload.

That is, system architecture 100 can involve a DCaaS where the data center is under cloud management 102 management (e.g., the customer does not provide infrastructure). Virtualized infrastructure (e.g., virtualization and overlay networking 112) can comprise a hypervisor on which the customer allocates virtual workloads (e.g., customer workload 110), which can be an IaaS implementation. That is, a full IaaS data center can be deployed as a service, and referred to as IaaSaaS.

Given those considerations, system architecture 100 can deploy an IaaS data center as a service. System architecture 100 can target a data center that is optimized for virtualized workloads on customer premises or a hosting facility. The customer can provide high-level resource definitions (e.g., intent-based provisioning) and service level agreements (SLAs) for a data center to cloud management 102. From this information, cloud management 102 can derive a data center hardware definition. Hardware corresponding to this hardware definition can be shipped to customer premise, or shipped to or allocated on a hosting site. When the hardware is shipped and ready, cloud management 102 can configure the hardware and networking, and then deploy and configure a virtualization stack on the hardware. In some examples, the hardware can be shipped, wired, deployed, and then configured. In other examples, the hardware can be pre-wired, pre-deployed, pre-configured, and then shipped. For example, one or more racks of hardware can be wired and connected, have a stack deployed on the hardware, and then the racks of hardware can be shipped. Once the racks of hardware are received at a destination, they can be connected to power and an external network and begin operations.

A data center can comprise storage (e.g., storage 116). A data center can also comprise compute (e.g., compute 118), which can comprise servers that lack (or do not utilize) local storage and are configured to boot from and store their data to storage 116. Booting can be implemented via technologies such as a preboot execution environment (PXE) book, or a network boot. The devices that the compute boots from can be configured by cloud management 102 as part of hardware and networking configuration. A data center can also comprise secondary storage (e.g., secondary storage 120). In some examples, there can be multiple instances of each of these components, and multiple different hardware models of each component can be deployed within a data center.

In some examples, local storage can be omitted from compute servers to facilitate maintenance. In such a system architecture, server hardware can be added or replaced and booted from the storage, without maintaining data on the server itself. Additionally, using a common boot device for virtual infrastructure can facilitate easier upgrades and configuration. Then, data protection can be facilitated by using such a system architecture.

Virtualization and overlay networking 112 can comprise the following to support data protection and mobility use cases. Virtualization and overlay networking 112 can comprise virtualized overlay networking (which virtualizes underlying network resources to components that operate on top of the virtual overlay network), and storage that is configured to spoof or virtualize volume identifiers (such as world wide names (WWNs)).

Where cloud management 102 manages the deployment and configuration of a data center, cloud management 102 can have information about the data center and the customer that cloud management 102 can use to manage the data center. This information can include customer infrastructure services information; ordered, deployed, and in-use resources; a customer's physical location; and customer SLAs.

System architecture 100 comprises cloud management 102, data centers 106, and communications network 122.

In turn, cloud management 102 comprises distributed data center component 104. Data centers 106 comprises a plurality of data centers, including data center 108. Data center 108 comprises customer workload 110, virtualization and overlay networking 112, and infrastructure 114. Infrastructure 114 comprises storage 116, compute 118, and secondary storage 1200.

Figure 10:
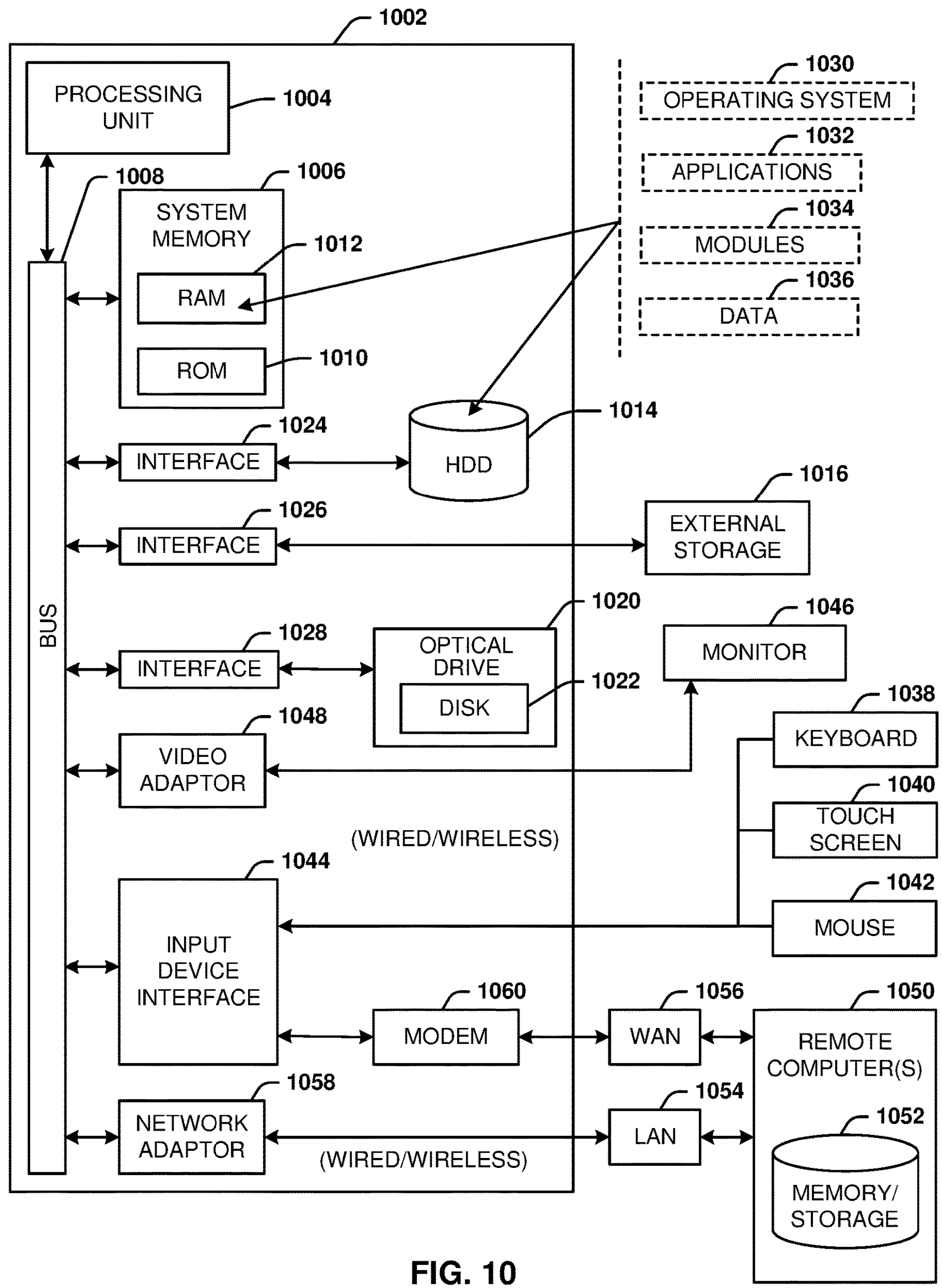
FIG. 10 illustrates an example block diagram of a computer operable to execute an embodiment of this disclosure.

Each of cloud management 102, data centers 106, and data center 108 can be implemented with part(s) of computing environment 1000 of FIG. 10. Communications network 122 can comprise a computer communications network, such as the INTERNET.

Cloud management 102 can communicate with data centers 106 and data center 108 via communications network 122 to manage data centers 106 and data center 108. In managing a data center, cloud management 102 can perform functions such as provisioning and managing virtualization and overlay networking 112, and infrastructure 114, and running customer workload 110 on data center 108.

Distributed data center component 104 of cloud management 102 can manage data centers 106 and data center 108 by creating a distributed data center that comprises multiple data centers of data centers 106. In effectuating a distributed data center, distributed data center component 104 can implement part(s) of the operating procedures of FIGS. 5-9.

Customer workload 110 can comprise workloads provided by a customer of data center 108 that operate on data center 108. Customer workload 110 can comprise a virtualized workload—e.g., a virtual machine on which customer components operate, and where the virtual machine operates on top of virtualization and overlay networking 112.

Virtualization and overlay networking 112 can comprise virtualization management component (e.g., a hypervisor) that supports the execution of customer workload 110. Virtualization and overlay networking 112 can also comprise storage virtualization. In some examples, the virtualization management can comprise management for virtual machine-based virtualization, for container-based virtualization, for other types of virtualization, or for a combination of types of virtualization.

Infrastructure 114 can comprise computer hardware of data center 108. Storage 116 can comprise storage devices upon which computer data can be stored. Compute 118 can comprise one or more servers that process data stored on storage 116. In some examples, compute 118 omits using its own local storage, and instead uses storage 116 for storage. This separation of compute and storage hardware can facilitate managing a data center, as well as restoring a data center. Secondary storage 120 can be similar hardware to storage 116. Where storage 116 is used by compute 118, secondary storage can be used for backup and staging of data, such as to store a snapshot of storage 116, or to store data send from cloud management 102 in the course of managing data center 108.

Figure 2:
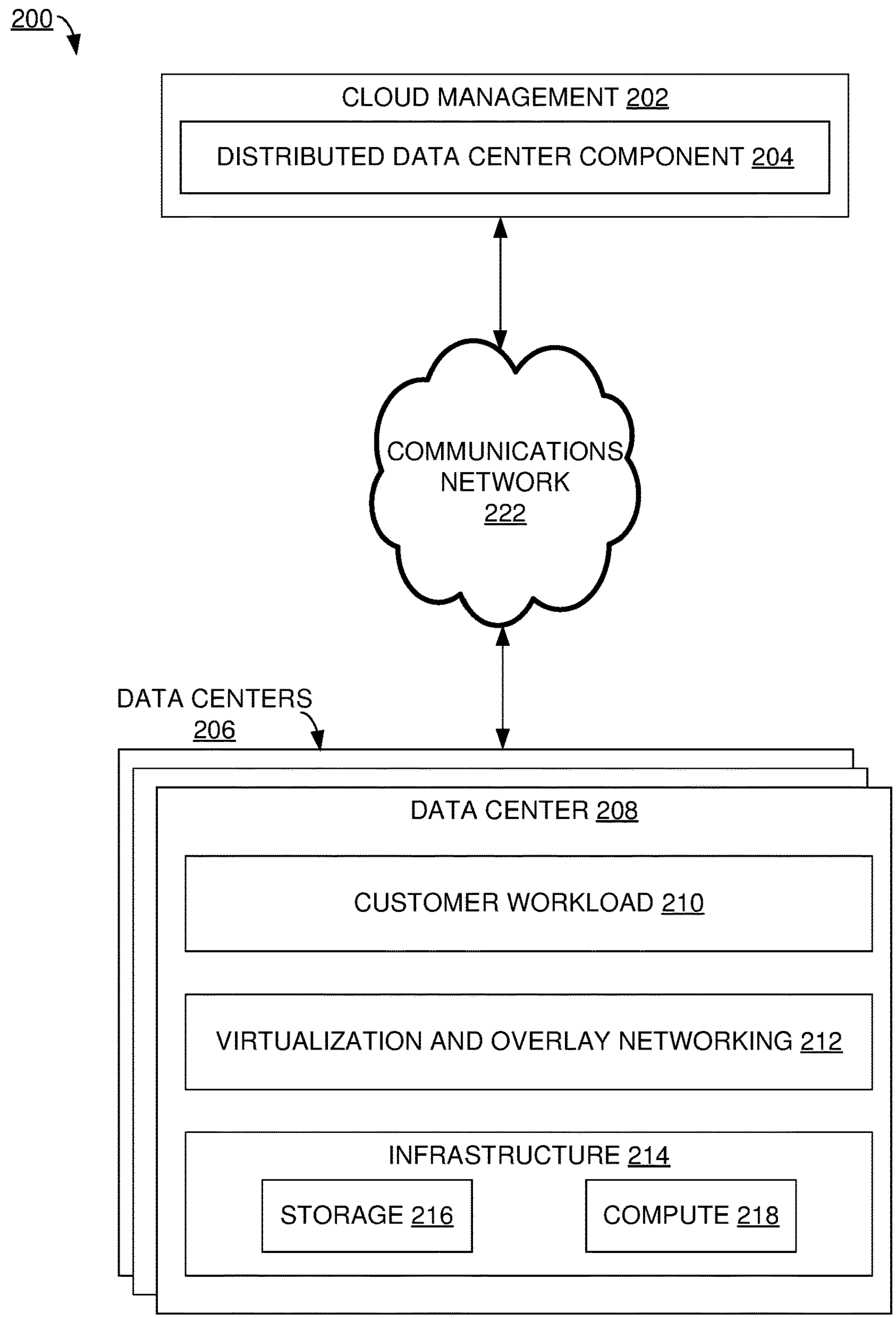
FIG. 2 illustrates another example system architecture that can facilitate a distributed data center, in accordance with an embodiment of this disclosure.

FIG. 2 illustrates another example system architecture 200 that can facilitate a distributed data center as a service, in accordance with an embodiment of this disclosure.

System architecture 200 comprises cloud management 202, data centers 206, and communications network 222 (which can be similar to cloud management 102, data centers 106, and communications network 122 of FIG. 1, respectively).

In turn, cloud management 202 comprises distributed data center component 204 (which can be similar to distributed data center component 104). Data centers 206 comprises a plurality of data centers, including data center 208 (which can be similar to data center 108). Data center 208 comprises customer workload 210, virtualization and overlay networking 212, and infrastructure 214 (which can be similar to customer workload 110, virtualization and overlay networking 112, and infrastructure 114, respectively). Infrastructure 214 comprises storage 216 and compute 218 (which can be similar to storage 116 and compute 118, respectively).

A difference between system architecture 200 and system architecture 100 can be that system architecture 200 lacks secondary storage in data center 208 while system architecture 100 has secondary storage 120 in data center 108. Despite this difference, system architecture 200 and system architecture 100 can still each be implemented to facilitate data center restoration.

Figure 3:
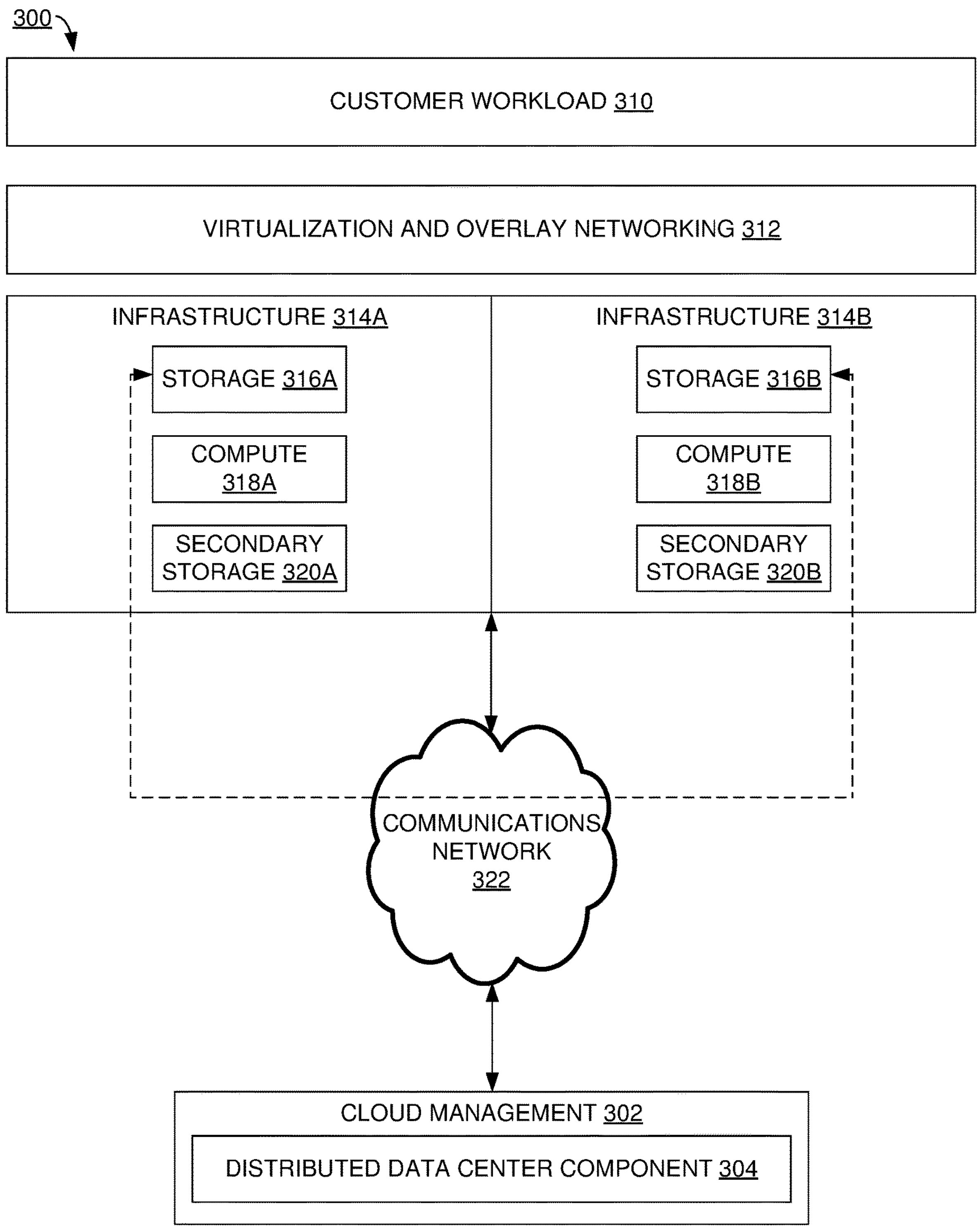
FIG. 3 illustrates another example system architecture that can facilitate a distributed data center in accordance with an embodiment of this disclosure.

FIG. 3 illustrates another example system architecture 300 that can facilitate a distributed data center, and that can facilitate a distributed data center as a service, in accordance with an embodiment of this disclosure.

System architecture 300 comprises cloud management 302, customer workload 310, virtualization and overlay networking 312, infrastructure 314A, infrastructure 314B, and communications network 322 (which can be similar to cloud management 102, customer workload 110, virtualization and overlay networking 112, infrastructure 114, another instance of infrastructure 114, and communications network 122 of FIG. 1, respectively).

In turn, cloud management 302 comprises distributed data center component 304 (which can be similar to distributed data center component 104). Customer workload 310 and virtualization and overlay networking 312 can be similar to customer workload 110 and virtualization and overlay networking 112, respectively.

Infrastructure 314A comprises storage 316A, compute 318A, and secondary storage 320A (which can be similar to storage 116, compute 118, and secondary storage 120, respectively). Infrastructure 314B comprises storage 316B, compute 318B, and secondary storage 320B (which can be similar to storage 116, compute 118, and secondary storage 120, respectively).

Using storage mirroring (e.g., mirroring of storage 316A and storage 316B), networking technology (such as virtualization and overlay networking 312), and with active compute (e.g., compute 318A and compute 318B), on both locations of a distributed data center (e.g., infrastructure 314A and infrastructure 314B), a distributed data center can automatically be created. Each component data center of a distributed data center can have active compute and workloads, and workloads can be run freely on both locations.

Storage 316A and storage 316B can be configured in a mirroring configuration, where writes written to one storage are immediately and inline mirrored to the other. This configuration can mean that data in storage 316A and storage 316B can be identical (or mirrored). In some examples, technologies such as redundant array of inexpensive disks (RAID) 1, synchronous storage replicas, distributed storage volumes, synchronous clones, and active-active storage volumes can be used to implement mirroring between storage 316A and storage 316B.

While the example of system architecture 300 (and system architecture 400 of FIG. 4) illustrates two data centers in a distributed data center, it can be appreciated that there can be distributed data centers made up of more than two data centers. In some examples, component data centers in a distributed data center (e.g., infrastructure 314A and infrastructure 314B) can be referred to as "data center locations," to distinguish these component data centers from the collected distributed data center.

A distributed data center as in system architecture 300 can be used for data center expansion beyond the physical limits of a data center facility. One data center location can run out of floor space, reach electricity load limits, or air conditioning limits, and so additional expansion is to happen at a different location.

In some examples, the data center locations in a distributed data center are not identical in terms of hardware capabilities, but are managed and exposed to users as one unified data center.

In some examples, cloud management 302 can communicate with virtualization management of virtualization and overlay networking 312 to create affinity between workloads, to designate coupled workloads to run at a same data center location. This approach of affinity between workloads can increase runtime efficiency.

In some examples, a distributed data center architecture can be distinguished from an availability zone architecture. In some examples, an availability zone architecture is active/passive between zones, whereas multiple data center locations of a distributed data center are active concurrently.

In some examples, an availability zone architecture involves nearly-identical data centers (where a passive data center is to handle all workloads being processed by an active data center), whereas data center locations in a distributed data center can be more heterogenous. An availability zone architecture can require identical storage in both locations, whereas it can be that a distributed architecture does not require this. An availability zone architecture can implement a high availability mechanism to orchestrate a failover between data centers for a workload to migrate, and this can be omitted in a distributed data center architecture. In some examples, an availability zone architecture involves separate power and infrastructure to make the availability zones separately available where one fails, and there can be examples of distributed data center architectures where this is neither required nor needed.

Figure 4:
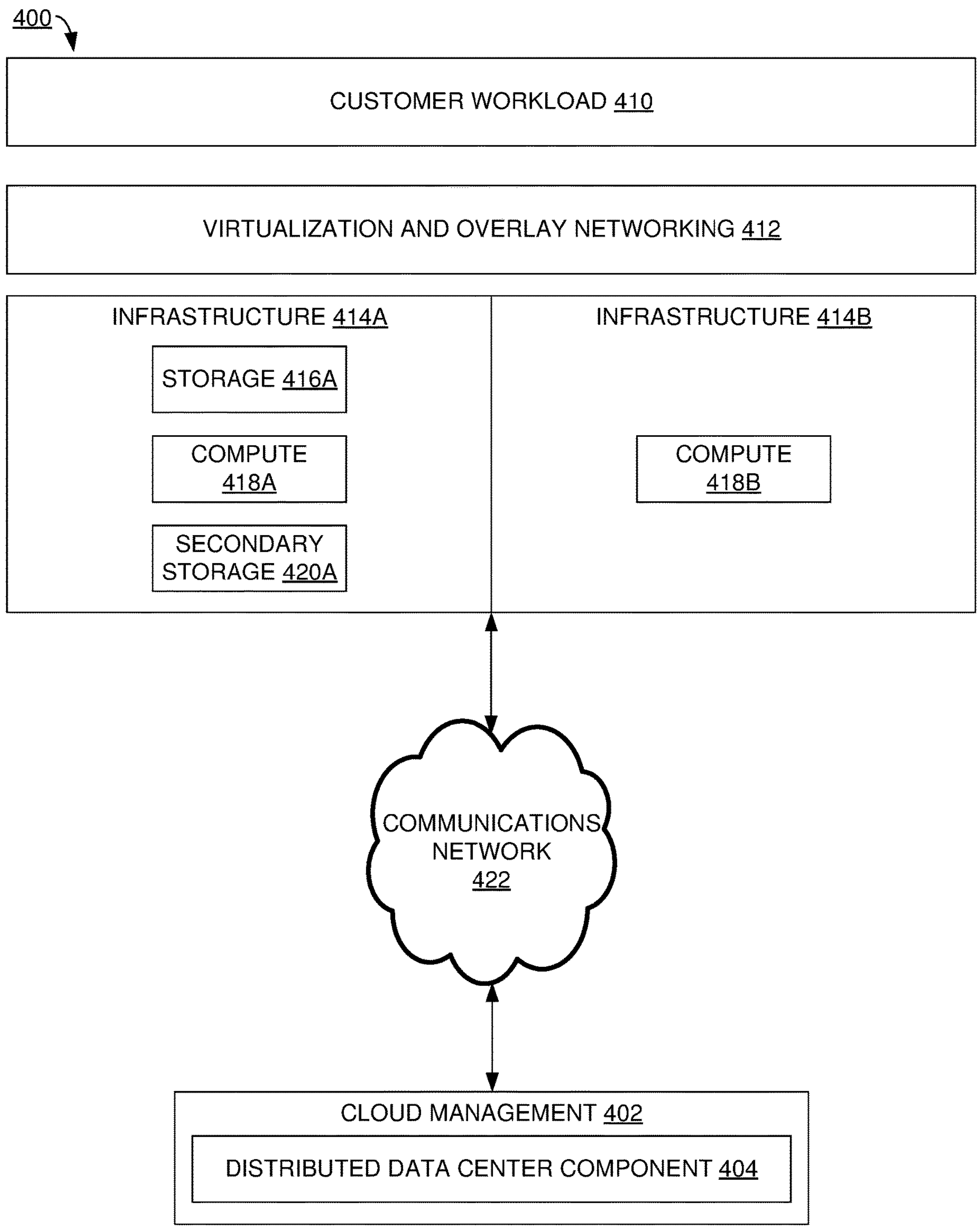
FIG. 4 illustrates another example system architecture that can facilitate a distributed data center in accordance with an embodiment of this disclosure.

FIG. 4 illustrates another example system architecture 400 that can facilitate a distributed data center, and that can facilitate a distributed data center as a service, in accordance with an embodiment of this disclosure.

System architecture 400 comprises cloud management 402, customer workload 410, virtualization and overlay networking 412, infrastructure 414A, infrastructure 414B, and communications network 422 (which can be similar to cloud management 102, customer workload 110, virtualization and overlay networking 112, infrastructure 114, another instance of infrastructure 114, and communications network 122 of FIG. 1, respectively).

In turn, cloud management 402 comprises distributed data center component 404 (which can be similar to distributed data center component 104). Customer workload 410 and virtualization and overlay networking 412 can be similar to customer workload 110 and virtualization and overlay networking 112, respectively.

Infrastructure 414A comprises storage 416A, compute 418A, and secondary storage 420A (which can be similar to storage 116, compute 118, and secondary storage 120, respectively). Infrastructure 414B comprises compute 418B (which can be similar to compute 118). A difference between system architecture 400 and system architecture 300 of FIG. 3 is that system architecture 400 depicts a distributed storage system where some infrastructure (infrastructure 414B) omits storage. In some examples, a distributed data center can comprise at least two physical data center locations that have other hardware differences, such as differences in compute, secondary storage, object storage, file systems, NASes, hardware for performance acceleration, and specialized servers or hardware for specific purposes.

In such examples, storage 416A can be used for storage for the distributed data center, and both compute 418A of infrastructure 414A and compute 418B of infrastructure 414B can operate on data that is stored in storage 416A.

Figure 5:
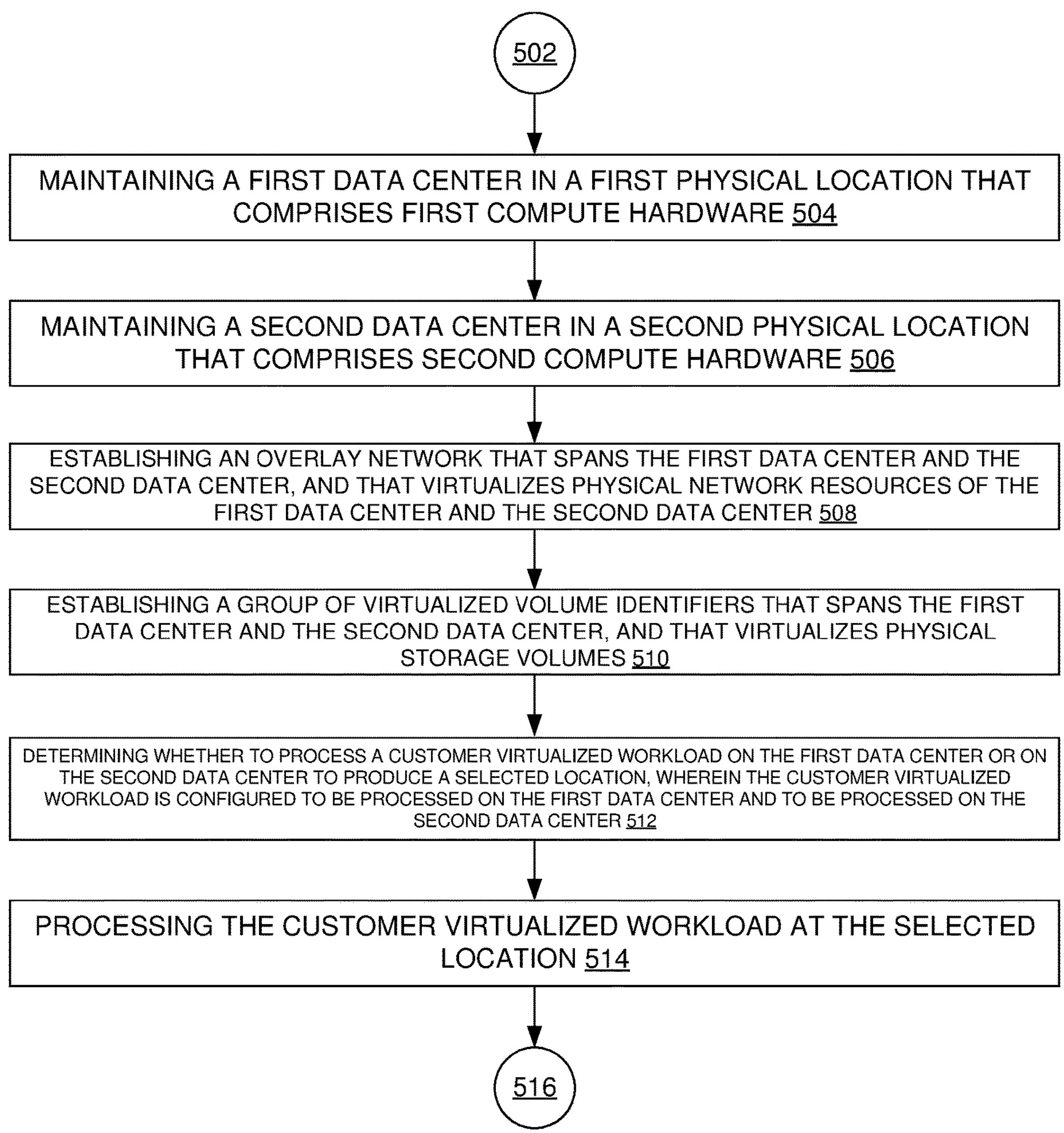
FIG. 5 illustrates an example process flow for a distributed data center, in accordance with an embodiment of this disclosure.

FIG. 5 illustrates an example process flow 500 for a distributed data center, in accordance with an embodiment of this disclosure. In some examples, one or more embodiments of process flow 500 can be implemented by distributed data center component 104 of FIG. 1, distributed data center component 204 of FIG. 2, or computing environment 1000 of FIG. 10.

It can be appreciated that the operating procedures of process flow 500 are example operating procedures, and that there can be embodiments that implement more or fewer operating procedures than are depicted, or that implement the depicted operating procedures in a different order than as depicted. In some examples, process flow 500 can be implemented in conjunction with one or more embodiments of one or more of process flow 600 of FIG. 6, process flow 700 of FIG. 7, process flow 800 of FIG. 8, and/or process flow 900 of FIG. 9.

Process flow 500 begins with 502, and moves to operation 504. Operation 504 depicts maintaining a first data center in a first physical location that comprises first compute hardware. Using the example of system architecture 300 of FIG. 3, the first data center can comprise infrastructure 314A, and the first compute hardware can be compute 318A. In system architecture 400 of FIG. 4, the first data center can comprise infrastructure 414A, and the first compute hardware can be compute 418A.

After operation 504, process flow 500 moves to operation 506.

Operation 506 depicts maintaining a second data center in a second physical location that comprises second compute hardware. Using the example of system architecture 300 of FIG. 3, the first data center can comprise infrastructure 314B, and the first compute hardware can be compute 318B. In system architecture 400 of FIG. 4, the first data center can comprise infrastructure 414B, and the first compute hardware can be compute 418B. In some examples, hardware of the second data center can differ from hardware of the first data center, such as differences in compute, storage, secondary storage, object storage, file systems, NASes, hardware for performance acceleration, and specialized servers or hardware for specific purposes In some examples, the first data center has a first group of processing capabilities, wherein the second data center has a second group of processing capabilities, and wherein the first group of processing capabilities differs from the second group of processing capabilities. That is, heterogenous data centers can be combined into a distributed data center.

In some examples, the first data center comprises storage resources, and wherein the second data center omits storage resources. For example, in system architecture 400 of FIG. 4, infrastructure 414A comprises storage 416A (and secondary storage 420A), while infrastructure 414B omits storage.

After operation 506, process flow 500 moves to operation 508.

Operation 508 depicts establishing an overlay network that spans the first data center and the second data center, and that virtualizes physical network resources of the first data center and the second data center. This overlay network can comprise a portion of virtualization and overlay networking 312 in system architecture 300 of FIG. 3 that involves an overlay network, or a portion of virtualization and overlay networking 412 in system architecture 400 of FIG. 4 that involves an overlay network.

After operation 508, process flow 500 moves to operation 510.

Operation 510 depicts establishing a group of virtualized volume identifiers that spans the first data center and the second data center, and that virtualizes physical storage volumes. This group of virtualized volume identifiers can comprise a portion of virtualization and overlay networking 312 in system architecture 300 of FIG. 3 that involves virtualized volume identifiers, or a portion of virtualization and overlay networking 412 in system architecture 400 of FIG. 4 that involves an virtualized volume identifiers.

After operation 510, process flow 500 moves to operation 512.

Operation 512 depicts determining whether to process a customer virtualized workload on the first data center or on the second data center to produce a selected location, wherein the customer virtualized workload is configured to be processed on the first data center and to be processed on the second data center. That is, the selected location can be to run a customer virtualized workload on infrastructure 314A of FIG. 3, or on infrastructure 314B.

After operation 512, process flow 500 moves to operation 514.

Operation 514 depicts processing the customer virtualized workload at the selected location. That is, using the example of system architecture 300 of FIG. 3, depending on which of infrastructure 314A and infrastructure 314B is chosen as the selected location, customer workload 310 can be run on the respective infrastructure.

After operation 514, process flow 500 moves to 516, where process flow 500 ends.

Figure 6:
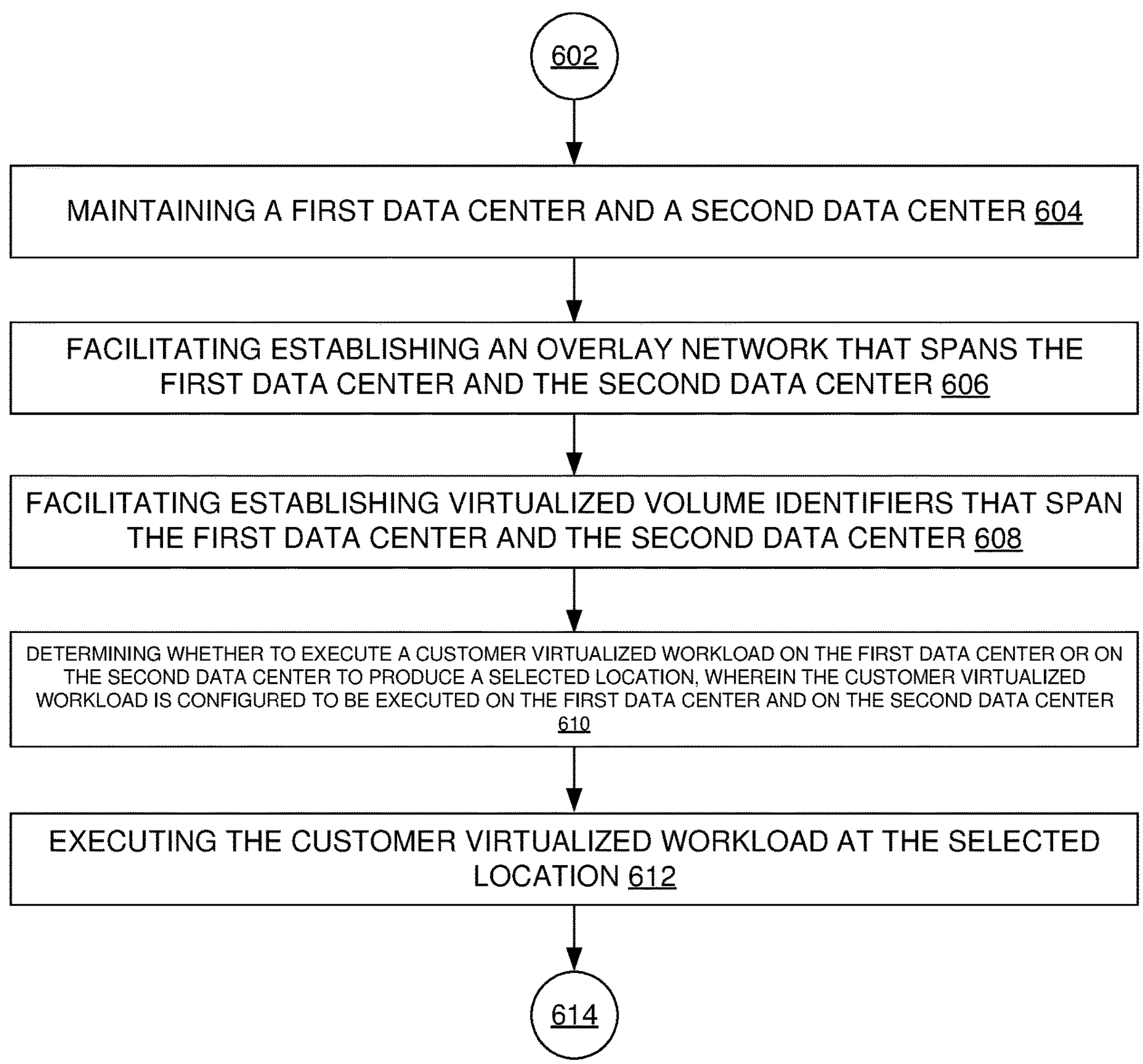
FIG. 6 illustrates another example process flow for a distributed data center, in accordance with an embodiment of this disclosure.

FIG. 6 illustrates another example process flow 600 for a distributed data center, in accordance with an embodiment of this disclosure. In some examples, one or more embodiments of process flow 600 can be implemented by distributed data center component 104 of FIG. 1, distributed data center component 204 of FIG. 2, or computing environment 1000 of FIG. 10.

It can be appreciated that the operating procedures of process flow 600 are example operating procedures, and that there can be embodiments that implement more or fewer operating procedures than are depicted, or that implement the depicted operating procedures in a different order than as depicted. In some examples, process flow 600 can be implemented in conjunction with one or more embodiments of one or more of process flow 500 of FIG. 5, process flow 700 of FIG. 7, process flow 800 of FIG. 8, and/or process flow 900 of FIG. 9.

Process flow 600 begins with 602, and moves to operation 604. Operation 604 depicts maintaining a first data center and a second data center. In some examples, operation 604 can be implemented in a similar manner as operations 506-508 of FIG. 5.

In some examples, the first data center and the second data center are presented as a unified data center to a customer account. That is, using the example of system architecture 300 of FIG. 3, the first data center and the second data center can be infrastructure 314A and infrastructure 314B, respectively. These two data centers can be combined into one logical, distributed data center so that is presented to a customer, and that runs customer workloads, like customer workload 310.

In some examples, a cloud management platform is separate from the first data center and the second data center, and the cloud management platform manages the first data center and the second data center. That is, continuing with the example of system architecture 300 of FIG. 3, cloud management 302 can manage both infrastructure 314A and infrastructure 314B.

In some examples, the first data center comprises primary storage and secondary storage. That is, infrastructure 314A of FIG. 3 can comprise both storage 316A and secondary storage 320A.

In some examples, portions of respective computing resources of the first data center and the second data center are reserved for individual customers.

After operation 604, process flow 600 moves to operation 606.

Operation 606 depicts facilitating establishing an overlay network that spans the first data center and the second data center. In some examples, operation 606 can be implemented in a similar manner as operation 508 of FIG. 5.

In some examples, the overlay network abstracts physical network resources of the first data center and the second data center.

After operation 606, process flow 600 moves to operation 608.

Operation 608 depicts facilitating establishing virtualized volume identifiers that span the first data center and the second data center. In some examples, operation 608 can be implemented in a similar manner as operation 510 of FIG. 5.

In some examples, the virtualized volume identifiers abstract physical storage volumes.

After operation 608, process flow 600 moves to operation 610.

Operation 610 depicts determining whether to execute a customer virtualized workload on the first data center or on the second data center to produce a selected location, wherein the customer virtualized workload is configured to be executed on the first data center and on the second data center. In some examples, operation 610 can be implemented in a similar manner as operation 512 of FIG. 5.

After operation 610, process flow 600 moves to operation 612.

Operation 612 depicts executing the customer virtualized workload at the selected location. In some examples, operation 612 can be implemented in a similar manner as operation 514 of FIG. 5.

After operation 612, process flow 600 moves to 614, where process flow 600 ends.

Figure 7:
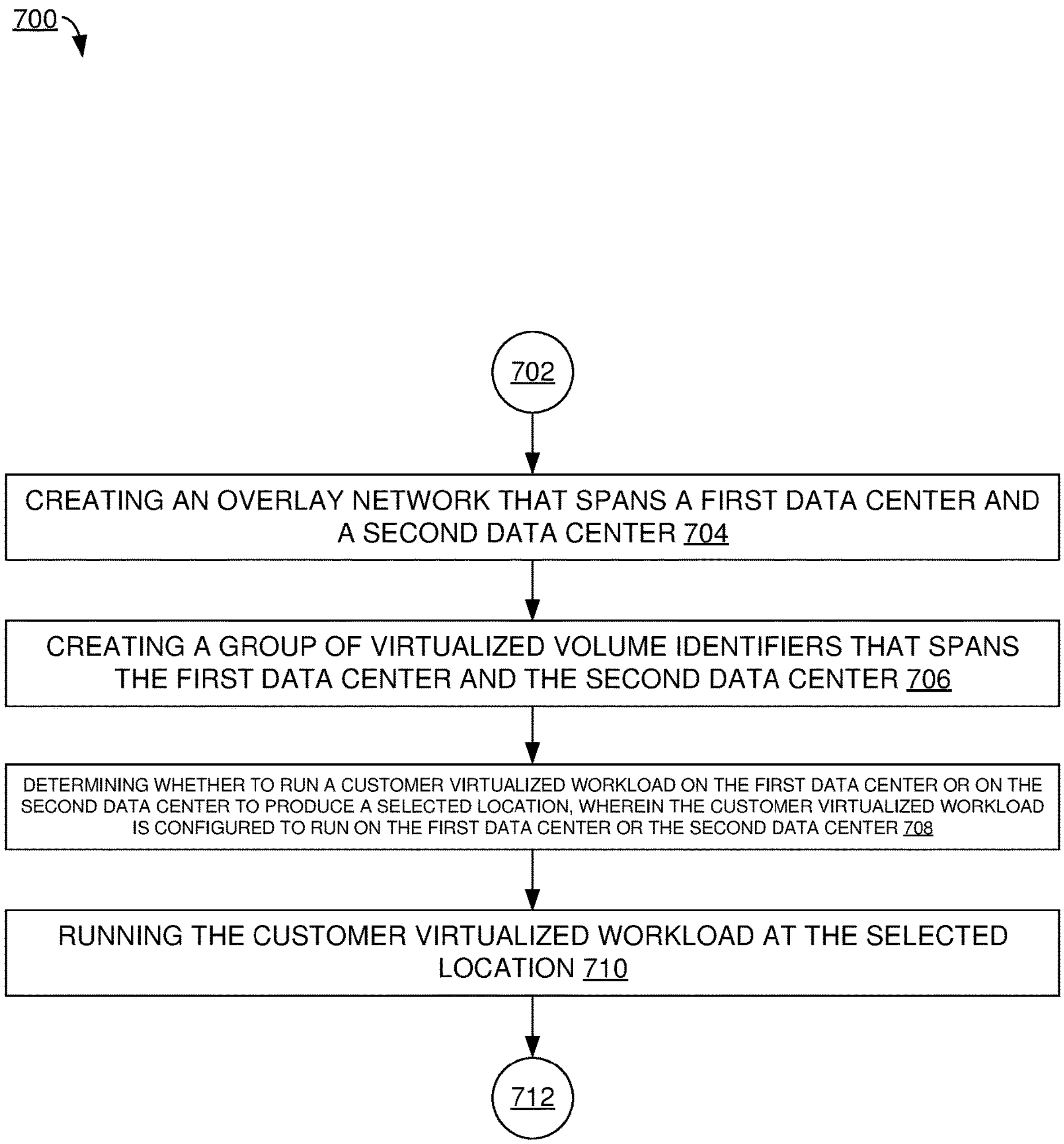
FIG. 7 illustrates another example process flow for a distributed data center, in accordance with an embodiment of this disclosure.

FIG. 7 illustrates another example process flow 700 for a distributed data center, in accordance with an embodiment of this disclosure. In some examples, one or more embodiments of process flow 700 can be implemented by distributed data center component 104 of FIG. 1, distributed data center component 204 of FIG. 2, or computing environment 1000 of FIG. 10.

It can be appreciated that the operating procedures of process flow 700 are example operating procedures, and that there can be embodiments that implement more or fewer operating procedures than are depicted, or that implement the depicted operating procedures in a different order than as depicted. In some examples, process flow 700 can be implemented in conjunction with one or more embodiments of one or more of process flow 500 of FIG. 5, process flow 600 of FIG. 6, process flow 800 of FIG. 8, and/or process flow 900 of FIG. 9.

Process flow 700 begins with 702, and moves to operation 704. Operation 704 depicts creating an overlay network that spans a first data center and a second data center. In some examples, operation 704 can be implemented in a similar manner as operation 508 of FIG. 5.

In some examples, the overlay network provides an abstraction between respective virtualized network resources and respective physical network resources of the first data center and the second data center, and wherein the customer virtualized workload accesses the physical network resources by referencing the virtualized network resources.

In some examples, the first data center, the second data center, and at least a third data center are part of a distributed data center, wherein the overlay network spans the distributed data center, and wherein the virtualized volume identifiers span the distributed data center. That is, whereas examples described herein generally involve a distributed data center that comprises two physical data center locations, it can be appreciated that there can be distributed data centers made up of more than two physical data center locations.

In some examples, the first data center has a first group of hardware capabilities, the second data center has a second group of hardware capabilities, and the first group of hardware capabilities differs from the second group of hardware capabilities. That is, there can be examples where data center locations that make up a distributed data center have different hardware capabilities, which can include a speed of processing and/or a type of processing (e.g., one data center location has specialized security hardware while another data center location does not).

After operation 704, process flow 700 moves to operation 706.

Operation 706 depicts creating a group of virtualized volume identifiers that spans the first data center and the second data center. In some examples, operation 706 can be implemented in a similar manner as operation 510 of FIG. 5.

In some examples, the group of virtualized volume identifiers provides an association between respective virtualized volume identifiers of the group of virtualized volume identifiers and respective physical storage volumes of the first data center and the second data center, and wherein the customer virtualized workload accesses the physical storage volumes by referencing the group of virtualized volume identifiers.

After operation 706, process flow 700 moves to operation 708.

Operation 708 depicts determining whether to run a customer virtualized workload on the first data center or on the second data center to produce a selected location, wherein the customer virtualized workload is configured to run on the first data center or the second data center. In some examples, operation 708 can be implemented in a similar manner as operation 512 of FIG. 5.

After operation 708, process flow 700 moves to operation 710.

Operation 710 depicts running the customer virtualized workload at the selected location. In some examples, operation 710 can be implemented in a similar manner as operation 514 of FIG. 5.

In some examples, the first data center operates on a first virtualized customer workload concurrently with the second data center operating on a second virtualized customer workload. In some examples, the first data center provides active compute resources concurrently with the second data center providing active compute resources. That is, both data centers (e.g., infrastructure 314A and infrastructure 314B of FIG. 3, or infrastructure 414A and infrastructure 414B of FIG. 4) can operate concurrently.

In some examples, a first system architecture of the first data center differs from a second system architecture of the second data center. That is, the data centers can be heterogenous rather than identical. This can be seen in the example of system architecture 400 of FIG. 4, where infrastructure 414A comprises storage 416A, while infrastructure 414B omits storage. In other examples, two data centers of a distributed data center can have the same type of hardware (e.g., storage components), but the respective hardware has different features, or is of different models (e.g., one data center has more storage than the other).

After operation 710, process flow 700 moves to 712, where process flow 700 ends.

Figure 8:
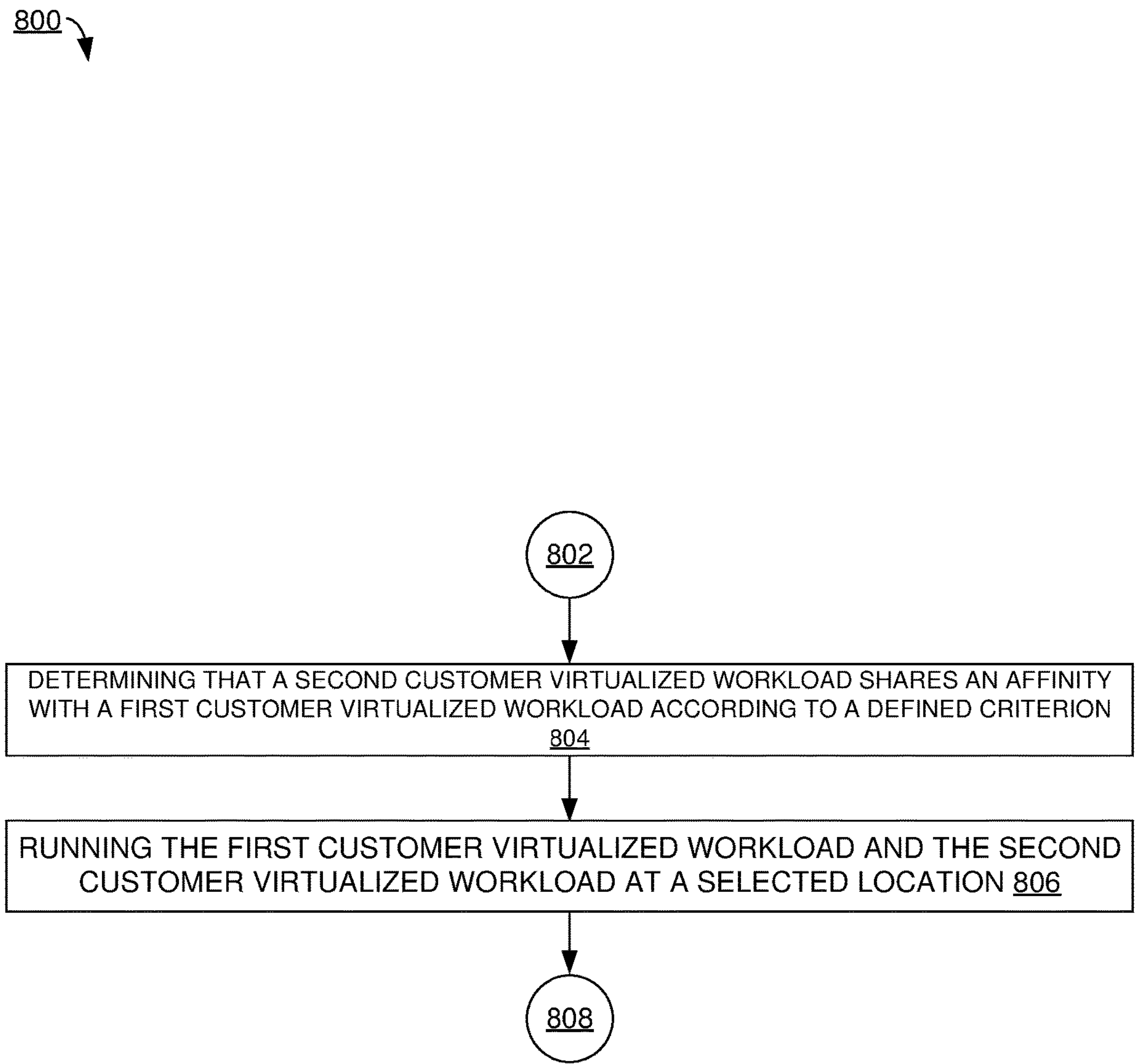
FIG. 8 illustrates an example process flow for running workloads with a shared affinity at the same data center location, and that can facilitate a distributed data center, in accordance with an embodiment of this disclosure.

FIG. 8 illustrates an example process flow 800 for running workloads with a shared affinity at the same data center location, and that can facilitate a distributed data center, in accordance with an embodiment of this disclosure. In some examples, one or more embodiments of process flow 800 can be implemented by distributed data center component 104 of FIG. 1, distributed data center component 204 of FIG. 2, or computing environment 1000 of FIG. 10.

It can be appreciated that the operating procedures of process flow 800 are example operating procedures, and that there can be embodiments that implement more or fewer operating procedures than are depicted, or that implement the depicted operating procedures in a different order than as depicted. In some examples, process flow 800 can be implemented in conjunction with one or more embodiments of one or more of process flow 500 of FIG. 5, process flow 600 of FIG. 6, process flow 700 of FIG. 7, and/or process flow 900 of FIG. 9.

Process flow 800 begins with 802, and moves to operation 804. Operation 804 depicts determining that a second customer virtualized workload shares an affinity with a first customer virtualized workload according to a defined criterion. In some examples, this affinity can be specified by user input data that is received from a user of a distributed data center. In some examples, this affinity can be determined based on two workloads interacting at least a threshold amount. For example, one workload can make application programming interface calls to another workload above a certain rate, or both workloads can access a same database above a certain rate.

In some examples, operation 804 comprises obtaining, from a cloud management platform that is separate from the first data center and the second data center, information that indicates that the second customer virtualized workload shares the affinity with the first customer virtualized workload.

After operation 804, process flow 800 moves to operation 806.

Operation 806 depicts running the first customer virtualized workload and the second customer virtualized workload at a selected location. Using the example of system architecture 300 of FIG. 3, this can comprise running both workloads on infrastructure 314A, or running both workloads on infrastructure 314B.

After operation 806, process flow 800 moves to 808, where process flow 800 ends.

Figure 9:
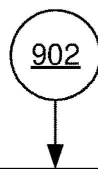
FIG. 9 illustrates an example process flow for operating multiple data center locations of a distributed data center concurrently, and that can facilitate a distributed data center, in accordance with an embodiment of this disclosure.
Figure 9:
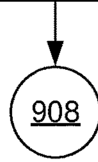

FIG. 9 illustrates an example process flow 900 for operating multiple data center locations of a distributed data center concurrently, and that can facilitate a distributed data center, in accordance with an embodiment of this disclosure. In some examples, one or more embodiments of process flow 900 can be implemented by distributed data center component 104 of FIG. 1, distributed data center component 204 of FIG. 2, or computing environment 1000 of FIG. 10.

It can be appreciated that the operating procedures of process flow 900 are example operating procedures, and that there can be embodiments that implement more or fewer operating procedures than are depicted, or that implement the depicted operating procedures in a different order than as depicted. In some examples, process flow 900 can be implemented in conjunction with one or more embodiments of one or more of process flow 500 of FIG. 5, process flow 600 of FIG. 6, process flow 700 of FIG. 7, and/or process flow 800 of FIG. 8.

Process flow 900 begins with 902, and moves to operation 904. Operation 904 depicts maintaining a first data center as active. The first data center can comprise infrastructure 314A of FIG. 3, or infrastructure 414A of FIG. 4.

After operation 904, process flow 900 moves to operation 906.

Operation 906 depicts maintaining a second data center as active concurrently with the first data center being active. The second data center can comprise infrastructure 314B of FIG. 3, or infrastructure 414B of FIG. 4. These data centers can be active concurrently because they are configured into a distributed data center. This can be viewed in contrast to other data center architectures, such as a standby data center or an activity zone data center, where one data center is active and the other data center is inactive (sometimes referred to as being standby or secondary).

After operation 906, process flow 900 moves to 908, where process flow 900 ends.

Example Operating Environment

In order to provide additional context for various embodiments described herein, FIG. 10 and the following discussion are intended to provide a brief, general description of a suitable computing environment 1000 in which the various embodiments of the embodiment described herein can be implemented.

For example, parts of computing environment 1000 can be used to implement one or more embodiments of cloud management 102, data centers 106, and/or data center 108 of FIG. 1, and/or cloud management 202, data centers 206, and/or data center 208 of FIG. 2.

In some examples, computing environment 1000 can implement one or more embodiments of the process flows of FIGS. 5-9 to facilitate a distributed data center.

While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 10, the example environment 1000 for implementing various embodiments described herein includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes ROM 1010 and RAM 1012. A basic input/output system (BIOS) can be stored in a nonvolatile storage such as ROM, erasable programmable read only memory (EPROM), EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive (HDD) 1014 (e.g., EIDE, SATA), one or more external storage devices 1016 (e.g., a magnetic floppy disk drive (FDD) 1016, a memory stick or flash drive reader, a memory card reader, etc.) and an optical disk drive 1020 (e.g., which can read or write from a CD-ROM disc, a DVD, a BD, etc.). While the internal HDD 1014 is illustrated as located within the computer 1002, the internal HDD 1014 can also be configured for external use in a suitable chassis (not shown). Additionally, while not shown in environment 1000, a solid state drive (SSD) could be used in addition to, or in place of, an HDD 1014. The HDD 1014, external storage device(s) 1016 and optical disk drive 1020 can be connected to the system bus 1008 by an HDD interface 1024, an external storage interface 1026 and an optical drive interface 1028, respectively. The interface 1024 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

Computer 1002 can optionally comprise emulation technologies. For example, a hypervisor (not shown) or other intermediary can emulate a hardware environment for operating system 1030, and the emulated hardware can optionally be different from the hardware illustrated in FIG. 10. In such an embodiment, operating system 1030 can comprise one virtual machine (VM) of multiple VMs hosted at computer 1002. Furthermore, operating system 1030 can provide runtime environments, such as the Java runtime environment or the .NET framework, for applications 1032. Runtime environments are consistent execution environments that allow applications 1032 to run on any operating system that includes the runtime environment. Similarly, operating system 1030 can support containers, and applications 1032 can be in the form of containers, which are lightweight, standalone, executable packages of software that include, e.g., code, runtime, system tools, system libraries and settings for an application.

Further, computer 1002 can be enabled with a security module, such as a trusted processing module (TPM). For instance, with a TPM, boot components hash next in time boot components, and wait for a match of results to secured values, before loading a next boot component. This process can take place at any layer in the code execution stack of computer 1002, e.g., applied at the application execution level or at the operating system (OS) kernel level, thereby enabling security at any level of code execution.

A user can enter commands and information into the computer 1002 through one or more wired/wireless input devices, e.g., a keyboard 1038, a touch screen 1040, and a pointing device, such as a mouse 1042. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1004 through an input device interface 1044 that can be coupled to the system bus 1008, but can be connected by other interfaces, such as a parallel port, an IEEE 1394 serial port, a game port, a USB port, an IR interface, a BLUETOOTH® interface, etc.

A monitor 1046 or other type of display device can be also connected to the system bus 1008 via an interface, such as a video adapter 1048. In addition to the monitor 1046, a computer typically includes other peripheral output devices (not shown), such as speakers, printers, etc.

The computer 1002 can operate in a networked environment using logical connections via wired and/or wireless communications to one or more remote computers, such as a remote computer(s) 1050. The remote computer(s) 1050 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1052 is illustrated. The logical connections depicted include wired/wireless connectivity to a local area network (LAN) 1054 and/or larger networks, e.g., a wide area network (WAN) 1056. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 can be connected to the local network 1054 through a wired and/or wireless communication network interface or adapter 1058. The adapter 1058 can facilitate wired or wireless communication to the LAN 1054, which can also include a wireless access point (AP) disposed thereon for communicating with the adapter 1058 in a wireless mode.

When used in a WAN networking environment, the computer 1002 can include a modem 1060 or can be connected to a communications server on the WAN 1056 via other means for establishing communications over the WAN 1056, such as by way of the Internet. The modem 1060, which can be internal or external and a wired or wireless device, can be connected to the system bus 1008 via the input device interface 1044. In a networked environment, program modules depicted relative to the computer 1002 or portions thereof, can be stored in the remote memory/storage device 1052. It will be appreciated that the network connections shown are examples, and other means of establishing a communications link between the computers can be used.

When used in either a LAN or WAN networking environment, the computer 1002 can access cloud storage systems or other network-based storage systems in addition to, or in place of, external storage devices 1016 as described above. Generally, a connection between the computer 1002 and a cloud storage system can be established over a LAN 1054 or WAN 1056 e.g., by the adapter 1058 or modem 1060, respectively. Upon connecting the computer 1002 to an associated cloud storage system, the external storage interface 1026 can, with the aid of the adapter 1058 and/or modem 1060, manage storage provided by the cloud storage system as it would other types of external storage. For instance, the external storage interface 1026 can be configured to provide access to cloud storage sources as if those sources were physically connected to the computer 1002.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

CONCLUSION

As it is employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory in a single machine or multiple machines. Additionally, a processor can refer to an integrated circuit, a state machine, an application specific integrated circuit (ASIC), a digital signal processor (DSP), a programmable gate array (PGA) including a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units. One or more processors can be utilized in supporting a virtualized computing environment. The virtualized computing environment may support one or more virtual machines representing computers, servers, or other computing devices. In such virtualized virtual machines, components such as processors and storage devices may be virtualized or logically represented. For instance, when a processor executes instructions to perform "operations", this could include the processor performing the operations directly and/or facilitating, directing, or cooperating with another device or component to perform the operations.

In the subject specification, terms such as "datastore," data storage," "database," "cache," and substantially any other information storage component relevant to operation and functionality of a component, refer to "memory components," or entities embodied in a "memory" or components comprising the memory. It will be appreciated that the memory components, or computer-readable storage media, described herein can be either volatile memory or nonvolatile storage, or can include both volatile and nonvolatile storage. By way of illustration, and not limitation, nonvolatile storage can include ROM, programmable ROM (PROM), EPROM, EEPROM, or flash memory. Volatile memory can include RAM, which acts as external cache memory. By way of illustration and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

The illustrated embodiments of the disclosure can be practiced in distributed computing environments where certain tasks are performed by remote processing devices that are linked through a communications network. In a distributed computing environment, program modules can be located in both local and remote memory storage devices.

The systems and processes described above can be embodied within hardware, such as a single integrated circuit (IC) chip, multiple ICs, an ASIC, or the like. Further, the order in which some or all of the process blocks appear in each process should not be deemed limiting. Rather, it should be understood that some of the process blocks can be executed in a variety of orders that are not all of which may be explicitly illustrated herein.

As used in this application, the terms "component," "module," "system," "interface," "cluster," "server," "node," or the like are generally intended to refer to a computer-related entity, either hardware, a combination of hardware and software, software, or software in execution or an entity related to an operational machine with one or more specific functionalities. For example, a component can be, but is not limited to being, a process running on a processor, a processor, an object, an executable, a thread of execution, computer-executable instruction(s), a program, and/or a computer. By way of illustration, both an application running on a controller and the controller can be a component. One or more components may reside within a process and/or thread of execution and a component may be localized on one computer and/or distributed between two or more computers. As another example, an interface can include input/output (I/O) components as well as associated processor, application, and/or application programming interface (API) components.

Further, the various embodiments can be implemented as a method, apparatus, or article of manufacture using standard programming and/or engineering techniques to produce software, firmware, hardware, or any combination thereof to control a computer to implement one or more embodiments of the disclosed subject matter. An article of manufacture can encompass a computer program accessible from any computer-readable device or computer-readable storage/communications media. For example, computer readable storage media can include but are not limited to magnetic storage devices (e.g., hard disk, floppy disk, magnetic strips . . . ), optical discs (e.g., CD, DVD . . . ), smart cards, and flash memory devices (e.g., card, stick, key drive . . . ). Of course, those skilled in the art will recognize many modifications can be made to this configuration without departing from the scope or spirit of the various embodiments.

In addition, the word "example" or "exemplary" is used herein to mean serving as an example, instance, or illustration. Any embodiment or design described herein as "exemplary" is not necessarily to be construed as preferred or advantageous over other embodiments or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

What has been described above includes examples of the present specification. It is, of course, not possible to describe every conceivable combination of components or methods for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
at least one processor; and
at least one memory that stores executable instructions that, when executed by the at least one processor, facilitate performance of operations, comprising:
maintaining a first data center in a first physical location that comprises first compute hardware;
maintaining a second data center in a second physical location that comprises second compute hardware;
establishing an overlay network that spans the first data center and the second data center, and that virtualizes physical network resources of the first data center and the second data center;
establishing a group of virtualized volume identifiers that spans the first data center and the second data center, and that virtualizes physical storage volumes of the first data center and the second data center;
determining whether to process a first customer virtualized workload on the first data center or on the second data center to produce a selected location that identifies one of the first data center or the second data center, wherein the first customer virtualized workload is configured to be processed on one data center at a time of the first data center or on the second data center, wherein the first customer virtualized workload is configured to be processed on the first data center independently of the second data center, and wherein the first customer virtualized workload is configured to be processed on the second data center independently of the first data center;
processing the first customer virtualized workload at the selected location, wherein the first customer virtualized workload accesses physical storage volumes of the selected location by referencing the virtualized volume identifiers, and wherein respective virtualized volume identifiers of the virtualized volume identifiers differ from respective physical storage volume identifiers of the physical storage volumes; and
in response to determining that a first rate at which the first customer virtualized workload and a second customer virtualized workload call each other via application programming interface calls satisfies a first frequency criterion, or that a second rate at which the first customer virtualized workload and the second customer virtualized workload access a same database satisfies a second frequency criterion, running the second customer virtualized workload at the selected location.

2. The system of claim 1, wherein the first data center and the second data center are active concurrently.

3. The system of claim 1, wherein the first data center has a first group of processing capabilities, wherein the second data center has a second group of processing capabilities, and wherein the first group of processing capabilities differs from the second group of processing capabilities.

4. The system of claim 1, wherein the first data center comprises storage resources, and wherein the second data center omits the storage resources.

5. The system of claim 1, wherein the determining that the first rate at which the first customer virtualized workload and a second customer virtualized workload call each other via the application programming interface calls satisfies the first frequency criterion, or that the second rate at which the first customer virtualized workload and the second customer virtualized workload access the same database satisfies the second frequency criterion comprises determining that the second customer virtualized workload shares an affinity with the first customer virtualized workload, and wherein the operations further comprise:

obtaining, from a cloud management platform that is separate from the first data center and the second data center, information that indicates that the second customer virtualized workload shares the affinity with the first customer virtualized workload.

6. The system of claim 5, wherein the cloud management platform determined the affinity based on communicating with a virtualization management component operated by the first data center and the second data center.

7. The system of claim 1, wherein respective virtualized volume identifiers of the virtualized volume identifiers comprise respective worldwide names.

8. The system of claim 1, wherein the virtualized volume identifiers spoof the physical storage volume identifiers.

9. A method, comprising:

maintaining, by a system comprising at least one processor, a first data center and a second data center;

facilitating, by the system, establishing an overlay network that spans the first data center and the second data center;

facilitating, by the system, establishing virtualized volume identifiers that span the first data center and the second data center, and that virtualize physical storage volumes of the first data center and the second data center;

determining, by the system, whether to execute a first customer virtualized workload on the first data center or on the second data center to produce a selected location that identifies one of the first data center or the second data center, wherein the first customer virtualized workload is configured to be executed on the first data center independently of the second data center, and wherein the customer virtualized workload is configured to be executed on the second data center independently of the first data center;

executing, by the system, the first customer virtualized workload at the selected location, wherein the first customer virtualized workload accesses selected physical storage volumes of the selected location by referencing the virtualized volume identifiers, and wherein respective virtualized volume identifiers of the virtualized volume identifiers differ from respective physical storage volume identifiers of the physical storage volumes; and in response to determining that a first rate at which the first customer virtualized workload and a second customer virtualized workload call each other via application programming interface calls satisfies a first frequency criterion, or that a second rate at which the first customer virtualized workload and the second customer virtualized workload access a same database satisfies a second frequency criterion, executing, by the system, the second customer virtualized workload at the selected location.

10. The method of claim 9, wherein the first data center and the second data center are part of a group of data centers that comprises at least two data centers, and wherein the group of data centers are presented as a unified data center to a customer account.

11. The method of claim 9, wherein a cloud management platform is separate from the first data center and the second data center, and wherein the cloud management platform manages the first data center and the second data center.

12. The method of claim 9, wherein the first data center comprises primary storage and secondary storage.

13. The method of claim 9, wherein portions of respective computing resources of the first data center and the second data center are reserved for individual customers.

14. The method of claim 9, wherein the overlay network abstracts physical network resources of the first data center and the second data center.

15. The method of claim 9, wherein the determining that the first rate at which the first customer virtualized workload and the second customer virtualized workload call each other via application programming interface calls satisfies the first frequency criterion, or that the second rate at which the first customer virtualized workload and the second customer virtualized workload access the same database satisfies the second frequency criterion comprises determining that the second customer virtualized workload shares an affinity with the first customer virtualized workload, and further comprising:

obtaining, by the system and from a cloud management platform that is separate from the first data center and the second data center, information that indicates that the second customer virtualized workload shares the affinity with the first customer virtualized workload.

16. A non-transitory computer-readable medium comprising instructions that, in response to execution, cause a system comprising at least one processor to perform operations, comprising:

creating an overlay network that spans a first data center and a second data center;

creating a group of virtualized volume identifiers that spans the first data center and the second data center, and that virtualize physical storage volumes of the first data center and the second data center;

determining whether to run a first customer virtualized workload on the first data center or on the second data center to produce a selected location that identifies one of the first data center or the second data center, wherein the first customer virtualized workload is configured to run on the first data center independently of the second data center, or wherein the first customer virtualized workload is configured to run on the second data center independently of the first data center;

running the first customer virtualized workload at the selected location, wherein the first customer virtualized workload accesses selected physical storage volumes of the selected location by referencing the virtualized volume identifiers, and wherein respective virtualized volume identifiers of the virtualized volume identifiers differ from respective physical storage volume identifiers of the physical storage volumes; and in response to determining that a first rate at which the first customer virtualized workload and a second customer virtualized workload call each other via application programming interface calls satisfies a first frequency criterion, or that a second rate at which the first customer virtualized workload and the second customer virtualized workload access a same database satisfies a second frequency criterion, running the second customer virtualized workload at the selected location.

17. The non-transitory computer-readable medium of claim 16, wherein the overlay network provides an abstraction between respective virtualized network resources and respective physical network resources of the first data center and the second data center, and wherein the customer virtualized workload accesses the physical network resources by referencing the virtualized network resources.

18. The non-transitory computer-readable medium of claim 16, wherein the first data center has a first group of hardware capabilities, wherein the second data center has a second group of hardware capabilities, and wherein the first group of hardware capabilities differs from the second group of hardware capabilities.

19. The non-transitory computer-readable medium of claim 16, wherein the first data center, the second data center, and at least a third data center are part of a distributed data center, wherein the overlay network spans the distributed data center, and wherein the virtualized volume identifiers span the distributed data center.

20. The non-transitory computer-readable medium of claim 16, wherein a first system architecture of the first data center differs from a second system architecture of the second data center.

* * * * *